United States Patent [19]

Scaramucci

[11] Patent Number: 5,156,182

[45] Date of Patent: Oct. 20, 1992

[54] TOP-ENTRY CHECK VALVE WITH PIN FASTENERS

[76] Inventor: John P. Scaramucci, 10724 Woodridden, Oklahoma City, Okla. 73170

[21] Appl. No.: 762,539

[22] Filed: Sep. 18, 1991

[51] Int. Cl.$^5$ ............................................. F16K 15/03
[52] U.S. Cl. ............................... 137/454.2; 137/527.4; 137/527.8
[58] Field of Search ............ 137/315, 327, 328, 454.2, 137/454.4, 454.5, 454.6, 527, 527.2, 527.4, 527.6, 527.8

[56] References Cited

U.S. PATENT DOCUMENTS

| | | | |
|---|---|---|---|
| 485,745 | 11/1892 | Loveland . | |
| 556,636 | 3/1896 | Kuichling . | |
| 846,317 | 3/1907 | Kiddle | 137/527.4 |
| 1,399,684 | 12/1921 | Belcher | 137/527 |
| 1,647,036 | 10/1927 | Dileo . | |
| 1,827,913 | 10/1931 | Rymal . | |
| 2,048,088 | 7/1936 | Wagner | 251/126 |
| 2,282,532 | 5/1942 | Shenk | 251/123 |
| 2,844,164 | 7/1958 | Robbins | 137/454.6 |
| 2,918,934 | 12/1959 | Wheatley | 137/527.2 |
| 2,923,317 | 2/1960 | McInerney | 137/527.2 |
| 2,928,416 | 3/1960 | Balhouse | 137/527.8 |
| 3,075,547 | 1/1963 | Scaramucci | 137/516.2 |
| 3,119,594 | 1/1964 | Heggem | 251/228 |
| 3,295,550 | 1/1967 | Scaramucci | 137/527.4 |
| 3,394,731 | 7/1968 | Elliott | 137/527.8 |
| 3,817,277 | 6/1974 | Wheatley | 137/515.7 |
| 3,934,608 | 1/1976 | Guyton | 137/527.8 |
| 4,054,153 | 10/1977 | Guyton | 137/527.2 X |
| 4,223,697 | 9/1980 | Pendleton | 137/527.8 |
| 4,230,150 | 10/1980 | Scaramucci | 137/527 |
| 4,252,144 | 2/1981 | Scaramucci | 137/454.6 |
| 4,307,747 | 12/1981 | Carpenter | 137/315 |
| 4,508,139 | 4/1985 | Teumer | 137/315 |
| 4,796,663 | 1/1989 | Scaramucci | 137/527.8 X |

FOREIGN PATENT DOCUMENTS

1806409 9/1969 Fed. Rep. of Germany .
44-12462 6/1969 Japan .

Primary Examiner—Robert G. Nilson
Attorney, Agent, or Firm—Dunlap Codding Lee

[57] ABSTRACT

A top-entry check valve having a seat, cage, disc and removable bonnet utilizes pin fasteners to prevent movement of the seat, cage and disc in the downstream direction. An annular shoulder in the valve body prevents movement of the seat, cage and disc in the upstream direction. The disc has a hinge pin which is cradled in hinge pin supports of the cage to hold the disc in place. Removal of the bonnet allows access to the valve chamber for replacement of the seat, cage, disc or pin fasteners.

18 Claims, 6 Drawing Sheets

TOP-ENTRY CHECK VALVE WITH PIN FASTENERS

CROSS-REFERENCE TO RELATED APPLICATIONS

This application is related to the following applications filed on an even date herewith:

Top-Entry Check Valve Having Retainer Ring, Ser. No. 762,104.

Top-Entry Check Valve With Threaded Fasteners, Ser. No. 762,540.

Top-Entry Check Valve With Screw-In Seat, Ser. No. 762,514.

Top-Entry Check Valve Having Spring Retainer, Ser. No. 762,517.

Top-Entry Check Valve With Cartridge Secured By Projections, Ser. No. 761,594.

Top-Entry Check Valve With Cartridge Secured By Threaded Projections, Ser. No. 762,811.

Field of the Invention

This invention relates to improvements in top-entry swing check valves.

SUMMARY OF THE INVENTION

The present invention provides a top-entry check valve with a smooth, straight chamber which minimizes both turbulence and pressure drop of the fluid passing through the valve. The relatively small cavity of this design allows an overall reduction in size and weight over conventional top-entry check valves.

The cartridge assembly of the valve includes a seat, a cage and a disc. The seat and cage may are a unitary structure in order to make replacement of the seat and cage more easily accomplished through an access opening in valve body.

A removable bonnet is attached over the access opening to the valve chamber. With the bonnet detached, the seat, cage and disc can readily be replaced.

An annular shoulder in the valve chamber prevents the valve cartridge from moving in an upstream direction. A pin fastener engages the valve body and valve cartridge to hold the valve cartridge against movement in a downstream direction.

Additional advantages and features of the present invention will become apparent from the detailed description of the preferred embodiments of the invention when read in conjunction with the drawings and appended claims.

DETAILED DESCRIPTION OF THE PREFERRED EMBODIMENTS

Figure 1:
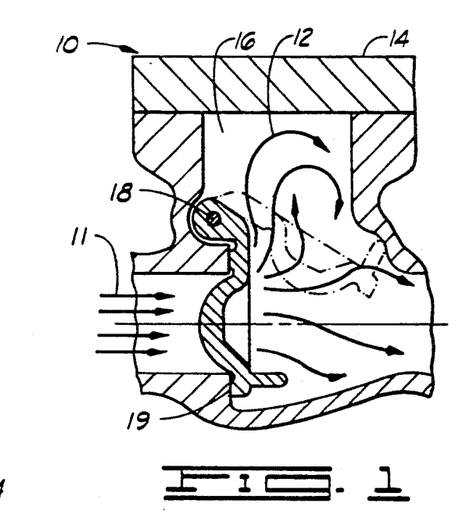
FIG. 1 is a vertical cross-sectional view of a prior art top-entry check valve with turbulent flow.

Referring now to the drawings in detail, and to FIG. 1 in particular, the reference numeral 10 generally designates a prior art top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

Figure 2:
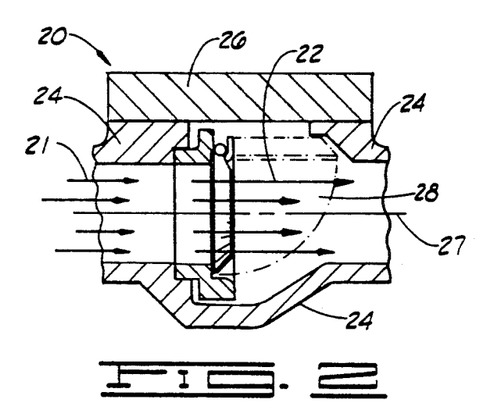
FIG. 2 is a vertical cross-sectional view of a top-entry check valve constructed in accordance with the present invention and illustrating the smooth flow through the valve chamber.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

Figure 3:
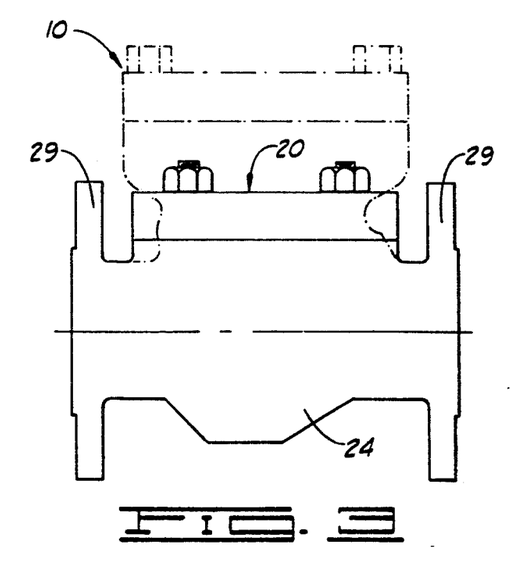
FIG. 3 is a side elevation of a top-entry check valve constructed in accordance with the present invention with a prior art top-entry check valve shown in outline to illustrate the improved dimensions of the present invention.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted with any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

Figure 4:
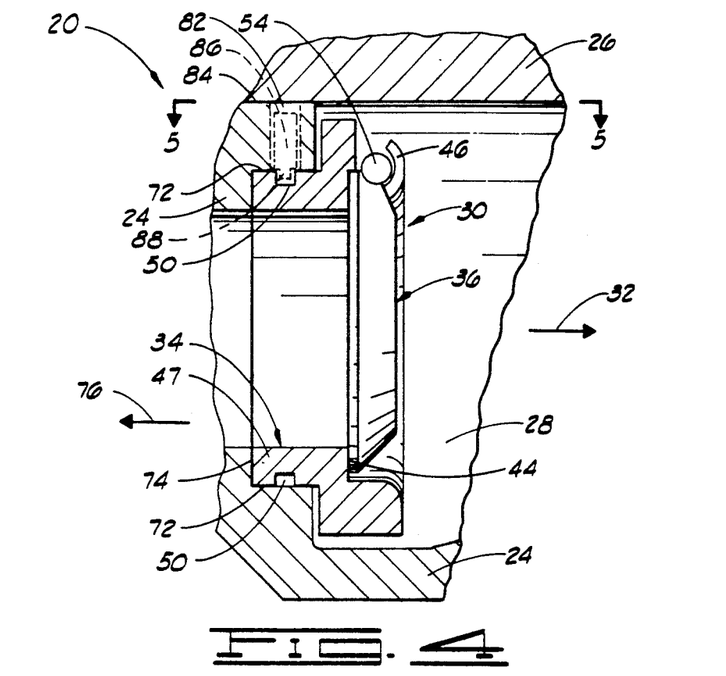
FIG. 4 is a vertical cross-sectional view of a portion of a top-entry check valve constructed in accordance with the present invention.
Figure 5:
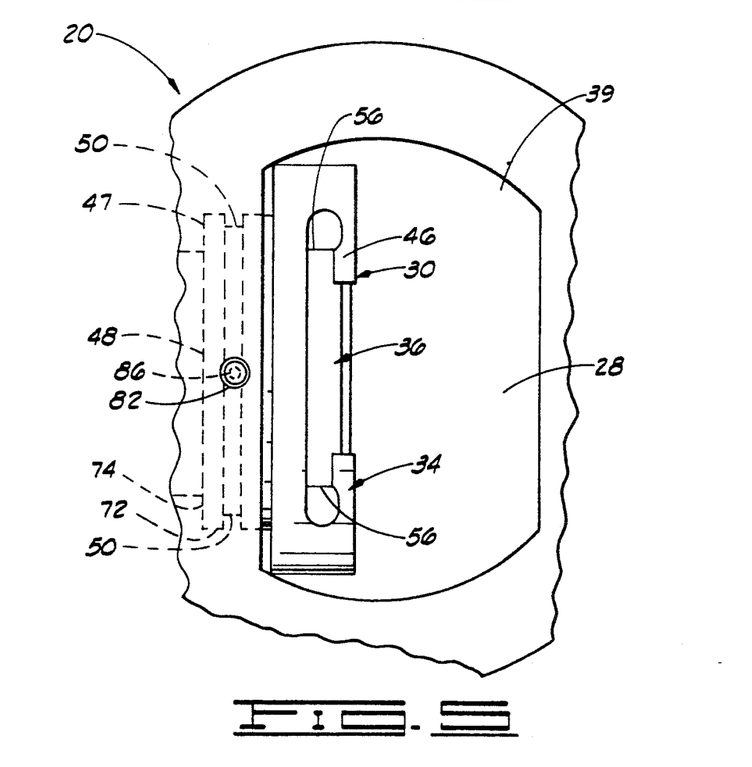
FIG. 5 is a cross-sectional view taken along lines 5—5 of FIG. 4.

Embodiment of FIGS. 4 and 5

In FIGS. 4 and 5, the central portion of a valve 20 constructed in accordance with the present invention is shown enlarged. As shown in these figures, the valve chamber 28 receives a valve cartridge assembly, generally designated by reference character 30. The valve cartridge assembly 30 controls the flow of fluid through the valve 20. The valve cartridge assembly 30 basically comprises a unitary valve seat and cage member 34 and a valve disc 36 supported on the member 34. As best shown in FIG. 5, an access opening 39 allows installation and removal of the valve cartridge assembly 30, when the bonnet 26 is detached from the valve body.

Figure 6:
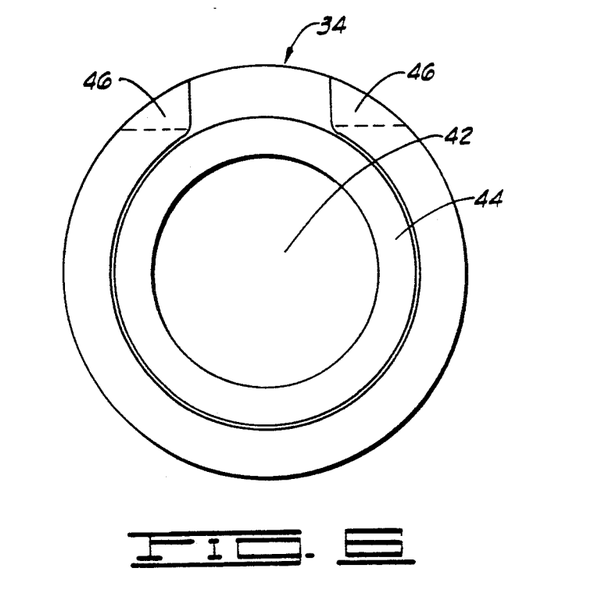
FIG. 6 is an elevational view of a unitary seat and cage of the valve of FIGS. 4 and 5 from the downstream side.
Figure 7:
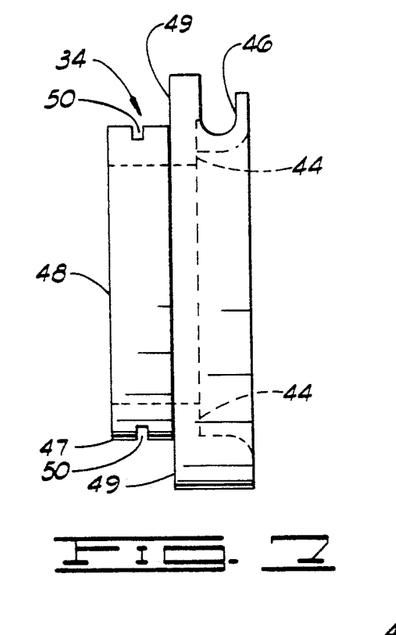
FIG. 7 is a side elevation of the unitary seat and cage of FIG. 6.
Figure 8:
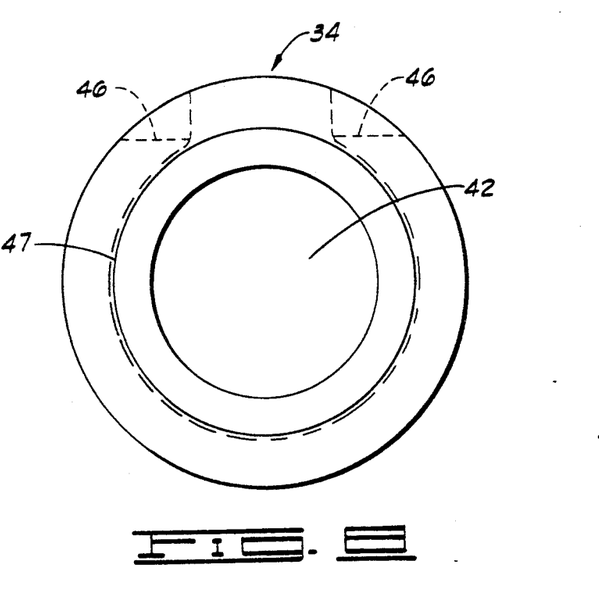
FIG. 8 is a elevational view of the unitary seat and cage of FIG. 6 from the upstream side.

The unitary seat and cage 34 of the valve 20 is shown separately in FIGS. 6, 7 and 8. The seat/cage 34 is generally circular with a flow opening 42 therethrough. An annular seating face 44 around the flow opening 42 is sized and shaped to mate with the disc 36. A pair of hinge pin supports 46 extend generally radially in the seat/cage 34 to suspend the disc 36 in the valve cartridge assembly 30. As best shown in FIG. 7, a reduced diameter extension 47 is formed on the upstream end 48 of the unitary seat and cage 34 and an annular shoulder 49 extends around the unitary seat and cage member 34. A recess 50 in the form of a circumferential groove is formed in the outer surface of a medial portion of the reduced diameter extension 47. FIG. 7 also illustrates that the hinge pin supports 46 are generally U-shaped in cross-section.

Figure 9:
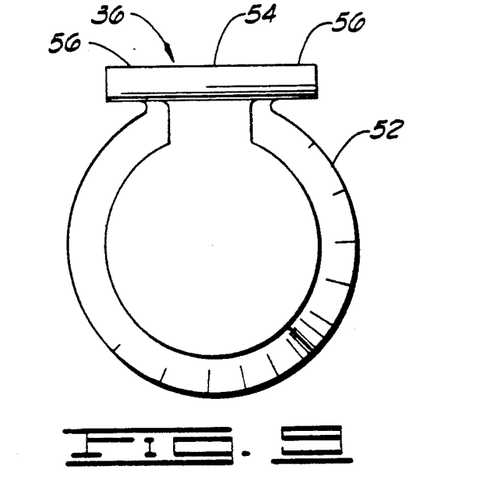
FIG. 9 is an elevational view of the disc of the valve of FIGS. 4 and 5 from the downstream side.
Figure 10:
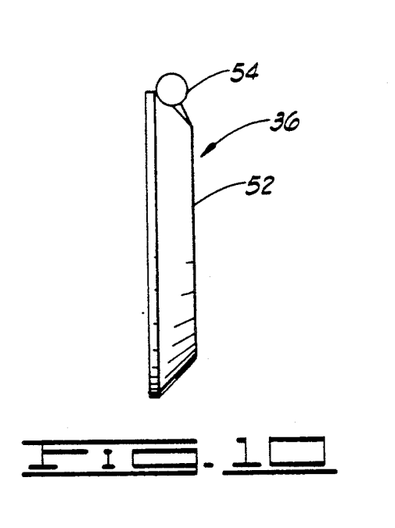
FIG. 10 is a side elevation of the disc of FIG. 9.
Figure 11:
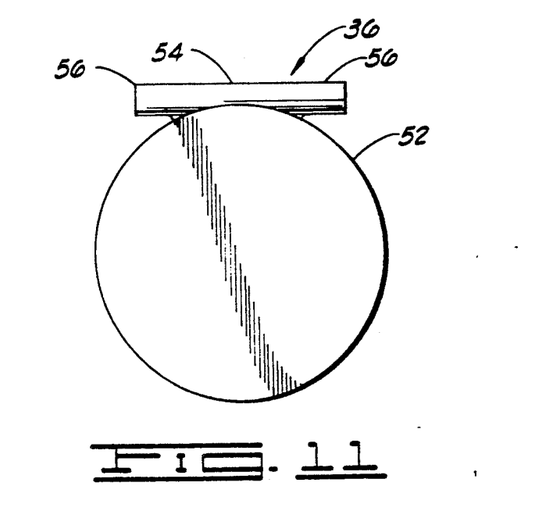
FIG. 11 is an elevational view of the disc of FIG. 9 from the upstream side.

The disc 36 of the valve 20 is shown separately in FIGS. 9, 10 and 11. The disc 36 is a generally circular flat plate 52. At least one hinge pin 54, with end portions 56, extends at a tangent from the plate 52. As discussed hereinafter, the end portions 56 of the hinge pin 54 pivotally support the disc 36 within the valve 20.

The arrangement of the valve cartridge assembly 30 in the valve chamber 28 is disclosed in FIGS. 4 and 5. As described hereinabove, the valve cartridge assembly 30 comprises the unitary seat and cage member 34 and the valve disc 36. The reduced diameter extension 47 of the unitary seat and cage 34 fits into a mating counterbore 72 of the valve body 24. The counterbore 72 forms an annular shoulder 74 facing downstream to mate with the upstream end 48 of the seat and cage 34. This arrangement prevents movement of the valve cartridge assembly 30 in the upstream direction indicated by arrow 76.

As best illustrated by FIG. 4, the hinge pin supports 46 of the unitary seat and cage member 34 cradle the end portions 56 of the hinge pin 54 of the disc 36 to suspend the disc 36 within the valve cartridge assembly 30. The disc 36 pivots about the axis of the hinge pin 54 to close against the seating face 44 of the unitary seat and cage member 34 to prevent flow through the valve cartridge assembly 30 in the upstream direction 76. Conversely, the disc 36 pivots about the axis of the hinge pin 54 to open away from the seating face 44 of the unitary seat and cage 34 and allow unobstructed flow through the valve cartridge assembly 30 in the downstream direction 32. The hinge pin supports 46 of the unitary seat and cage 34 are bent over to trap the end portions 56 of the hinge pin 54 of the disc 36. It should also be noted that the width of each hinge pin support 46 is larger than the diameter of the hinge pin 54 which allows the disc 36 to "float" when in a near-closed position.

Continuing to refer to FIG. 4, the valve body 24 has a pin fastener opening 82 therethrough extending from the top 84 of the valve body 24 into the mating counterbore 72. The pin fastener opening 82 is sized and shaped to receive a pin fastener 86. One end of the pin fastener 86 has a protrusion 88 which is sized and shaped to fit into the recess 50 of the reduced diameter extension 47 of the seat and cage 34.

With the reduced diameter extension 47 of the seat and cage 34 installed in the mating counterbore 72 of the valve body 24, the pin fastener opening 82 aligns with the recess 50 of the reduced diameter extension 47. The pin fastener 86 is inserted into the pin fastener opening 82 and the protrusion 88 extends into the recess 50. The protrusion 88 of the pin fastener 86 engages the upstream wall of the recess 50 to prevent downstream movement of the unitary seat and cage 34.

As FIG. 5 illustrates, the pin fastener 86 and valve cartridge assembly 30 are readily accessible with the bonnet 26 detached. The pin fastener 86 can be extracted from the pin fastener opening 82 to allow removal of the reduced diameter extension 47 of the unitary seat and cage 34 from the mating counterbore 72 of the valve body 24. The valve cartridge assembly 30 can then be removed from the valve chamber 28 through the access opening 39. Installation of the valve cartridge assembly 30 is performed by simply reversing the steps for removal. This arrangement allows easy replacement of the valve cartridge assembly 30 or of the unitary seat/cage 34 or disc 36 individually.

Figure 12:
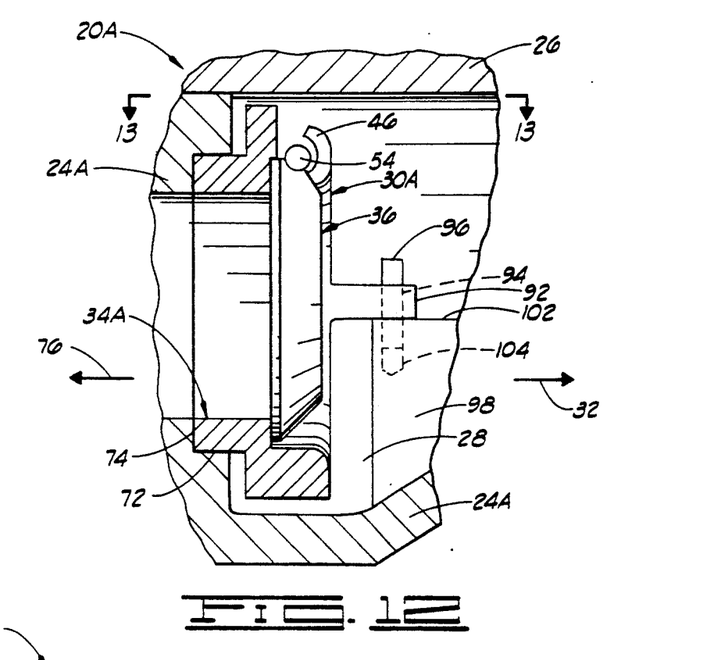
FIG. 12 is a vertical cross-sectional view of another form of top-entry check valve constructed in accordance with the present invention.
Figure 13:
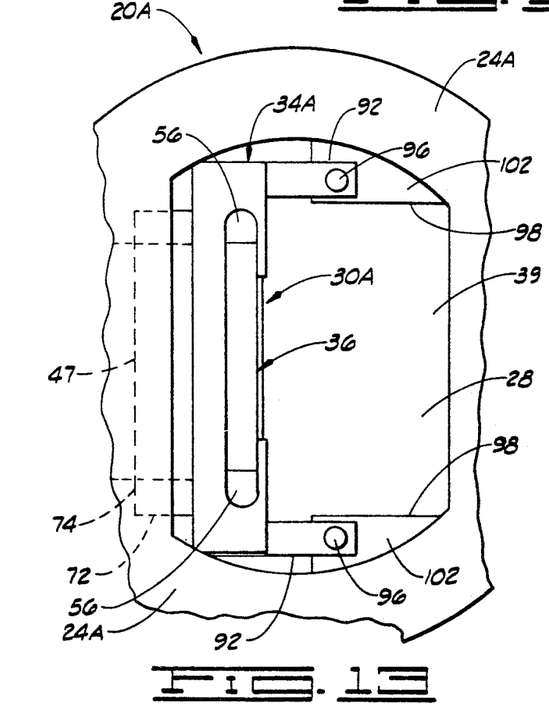
FIG. 13 is a cross-sectional view taken along lines 13—13 of the valve of FIG. 12.
Figure 14:
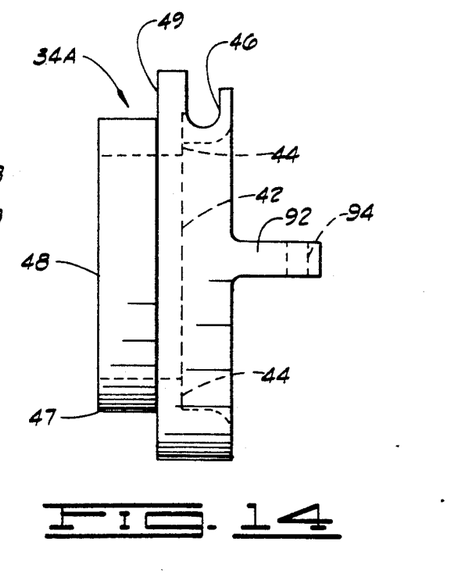
FIG. 14 is a side elevation of the unitary seat and cage of the valve of FIGS. 12 and 13.

Embodiment of FIGS. 12, 13 and 14

Referring now to FIG. 12, reference character 20A designates another form of a valve constructed in accordance with the present invention. The unitary seat and cage member 34A and the valve body 24A are slight modifications of the cage member 34 and body 24 previously described.

As shown in FIGS. 12, 13 and 14, the unitary seat and cage 34A has a pair of downstream extensions 92 with fastener slots 94 therethrough. Each fastener slot 94 is sized and shaped to receive a pin fastener 96. As best shown in FIGS. 12 and 13, the valve body 24A is formed with a pair of lugs 98 extending into the valve chamber 28. The upper surface 102 of each lug 98 has a pin fastener opening 104 sized and shaped to receive one of the pin fasteners 96. With the reduced diameter extension 47 of the unitary seat and cage 34A installed in the mating counterbore 72 of the valve body 24A, the pin fastener opening 104 of each lug 98 aligns with the fastener slot 94 of one of the downstream extensions 92. The insertion of one of the pin fasteners 96 through the fastener slot 94 and into the aligned pin fastener opening 104 secures the unitary seat and cage 34A against movement in the downstream direction 32.

As best shown in FIG. 13, the pin fasteners 96 are readily accessible when the bonnet 26 is detached from the valve body 24A. Extracting the pin fasteners 96 from the pin fastener holes 104 of the lugs 98 allows the reduced diameter extension 47 of the seat and cage 34A to be moved downstream out of the mating counterbore 72 of the valve body 24A. The valve cartridge assembly 30A can then be removed through the access opening 39. This construction permits easy removal and installation of the valve cartridge assembly 30A or the seat/cage 34A and disc 36 individually.

Figure 15:
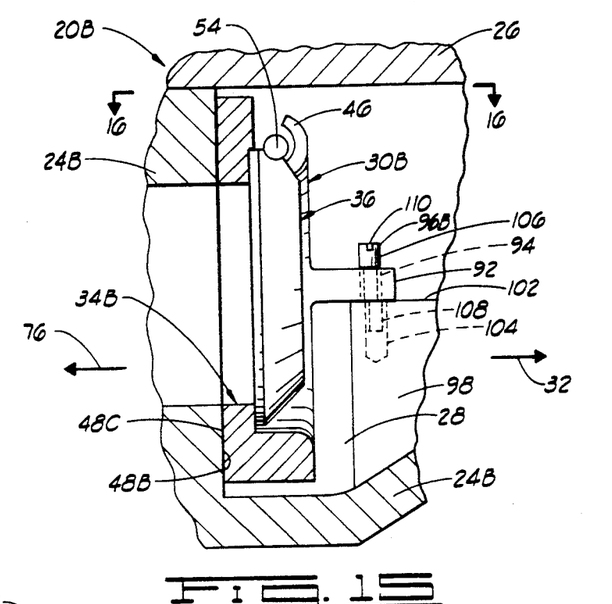
FIG. 15 is a vertical cross-sectional view of another form of top-entry check valve constructed in accordance with the present invention.
Figure 16:
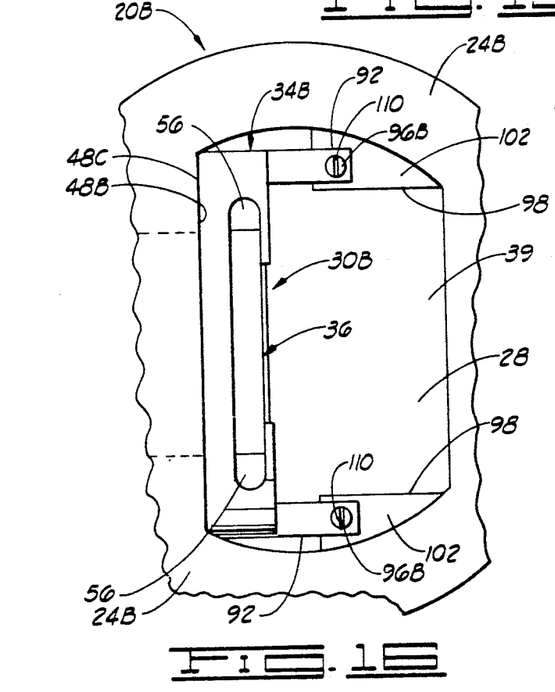
FIG. 16 is a cross-sectional view taken along lines 16—16 of the valve of FIG. 15.
Figure 17:
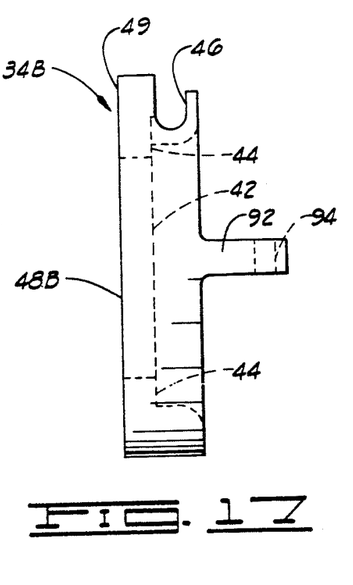
FIG. 17 is a side elevation of the unitary seat and cage of the valve of FIGS. 15 and 16.

Embodiment of FIGS. 15, 16 and 17

Referring now to FIG. 15, reference character 20B designates another form of a valve constructed in accordance with the present invention. The unitary seat and cage member 34B, the valve body 24B and the pin 96B are modifications of the seat/cage member 34A, the valve body 24A and the pin 96, respectively.

As best shown in FIG. 17, the unitary seat and cage member 34B is identical to the seat and cage member 34A, except that seat and cage member 34B has no reduced diameter extension 47. The valve body 24B is exactly like the valve body 24A, except that valve body 24B has no counterbore 72. As FIG. 15 best illustrates, the pin 96B has an offset at an intermediate point of its length. An upper offset portion 106 of each pin 96B extends through the fastener slot 94 of the corresponding downstream extension 92 of the seat and cage member 34B. A lower offset portion 108 of each pin 96B extends into the pin fastener opening 104 in the respective lug 98 in the valve body 24B. The top surface of the pin 96B has a slot 110 for use in turning the pin 96B with a screwdriver or the like.

As shown in FIG. 16, the offset pins 96B are readily accessible when the bonnet 26 is detached from the valve body 24B. To install the valve cartridge assembly 30B, the assembly 30B is inserted into the valve chamber 28 and each fastener slot 94 is aligned with the corresponding fastener opening 104. The lower offset portion 10 of each pin 96B is inserted into the respective fastener opening 104 with the upper offset 106 positioned toward the downstream direction 32. With the offset pins 96B in this position, the upstream end 48B of the seat and cage member 34B is not tightly secured against the downstream face 48C of the valve body 24B. The seat and cage member 34B is secured against the downstream face 48C of the valve body 24B by rotating each offset pin 96B so that the upper offset 106 is positioned toward the upstream direction 76 (the position shown in FIG. 15).

Removal of the valve cartridge 30B from the valve chamber 28 is basically the reverse of the installation process. With the bonnet 26 detached, the offset pins 96B are rotated to a position where the seat and cage member 34B is not tightly secured against the valve body 24B. Then the offset pins 96B are removed from the pin opening 104 and the pin slot 94. The valve cartridge assembly 30B is then free to be lifted out of the valve chamber 28 through the access opening 39.

Changes may be made in the combinations, operations and arrangements of the various parts and elements described herein without departing from the spirit and scope of the invention as defined in the following claims.

What is claimed is:

1. A top entry check valve, comprising:
    a valve cartridge assembly, including a seat, cage and disc;
    a body having an upstream end, a downstream end, a valve chamber therein communicating with the upstream and downstream ends thereof, an access opening in a side wall thereof communicating with the valve chamber of a size to accommodate the entry and removal of the valve cartridge assembly therethrough, and a pin fastener opening accessible from the access opening and extending through the body into the valve chamber, said body also having an annular shoulder therein facing downstream sized to engage the valve cartridge and prevent the valve cartridge from moving upstream;
    a bonnet removably attached to the body over said access opening; and
    a pin insertable into the pin fastener opening of the body;
    wherein the valve cartridge assembly has a recess aligning with the pin fastener opening of the body when the valve cartridge assembly is installed in the valve chamber and a portion of the pin extends into the recess to prevent the valve cartridge assembly from moving downstream.

2. A valve as defined in claim 1 wherein the disc is a generally circular flat plate having at least one hinge pin thereon extending along a tangent to the flat plate, and wherein the seat and cage of the cartridge assembly comprises a unitary structure forming an annular seating face sized to mate with the disc and a pair of hinge pin supports receiving the opposite end portions of the hinge pin.

3. A valve as defined in claim 2 wherein each hinge pin support faces radially with respect to the disc.

4. A valve as defined in claim 2 wherein each hinge pin support is generally U-shaped in cross section.

5. A valve as defined in claim 2 wherein each hinge pin support is sized larger than the diameter of the hinge pin, whereby the disc can float in upstream and downstream directions in a near-closed position.

6. A valve as defined in claim 2 wherein said hinge pin supports are generally U-shaped in cross-section and face radially with respect to the disc, and wherein one side of each hinge pin support is bent over a portion of the hinge pin to trap the hinge pin therein.

7. A valve as defined in claim 1 wherein the recess is defined to be a groove.

8. A valve as defined in claim 1 wherein the recess is defined to be a transverse groove extending for 360 degrees.

9. A valve as defined in claim 1 wherein the portion of the pin extending into the recess is defined to be a protrusion of the pin.

10. A top entry check valve, comprising:
    a valve cartridge assembly, including a seat, cage and disc, the seat and cage comprising a unitary structure having a reduced diameter extension with a recess formed on a medial portion of the reduced diameter extension;
    a body having an upstream end, a downstream end, a valve chamber therein communicating with the upstream and downstream ends thereof, an access opening in a side wall thereof communicating with the valve chamber of a size to accommodate the entry and removal of the valve cartridge assembly therethrough, and a pin fastener opening accessible from the access opening and extending through the body into the valve chamber, said body also having an annular shoulder therein facing downstream sized to engage the valve cartridge and prevent the valve cartridge from moving upstream and a mating counterbore receiving at least a portion of the reduced diameter extension of the unitary structure;
    a bonnet removably attached to the body over said access opening; and
    a pin insertable into the pin fastener opening of the body;

wherein the recess is aligned with the pin fastener opening of the body when the reduced diameter extension is installed in the mating counterbore and a portion of the pin extends into the recess to prevent the valve cartridge assembly from moving downstream.

11. A valve as defined in claim 10 wherein the portion of the pin extending into the recess is defined to be a protrusion of the pin.

12. A valve as defined in claim 10 wherein the recess is defined to be a groove.

13. A valve as defined in claim 10 wherein the recess is defined to be a transverse groove extending for 360 degrees.

14. A valve as defined in claim 10 wherein the disc is a generally circular flat plate having at least one hinge pin thereon extending along a tangent to the flat plate, and wherein the unitary structure forms an annular seating face sized to mate with the disc and has a pair of hinge pin supports receiving the opposite end portions of the hinge pin.

15. A valve as defined in claim 14 wherein each hinge pin support faces radially with respect to the disc.

16. A valve as defined in claim 14 wherein each hinge pin support is generally U-shaped in cross section.

17. A valve as defined in claim 14 wherein each hinge pin support is sized larger than the diameter of the hinge pin, whereby the disc can float in upstream and downstream directions in a near-closed position.

18. A valve as defined in claim 14 wherein said hinge pin supports are generally U-shaped in cross-section and face radially with respect to the disc, and wherein one side of each hinge pin support is bent over a portion of the hinge pin to trap the hinge pin therein.

* * * * *